United States Patent [19]

Kamiguchi

[11] Patent Number: 4,826,418
[45] Date of Patent: May 2, 1989

[54] INJECTION MOLDING MACHINE CAPABLE OF STARTING AND STOPPING BY REMOTE-CONTROL

[75] Inventor: Masao Kamiguchi, Houya, Japan
[73] Assignee: Fanuc Ltd, Minamitsuru, Japan
[21] Appl. No.: 205,323
[22] PCT Filed: Oct. 16, 1987
[86] PCT No.: PCT/JP87/00796
   § 371 Date: May 2, 1988
   § 102(e) Date: May 2, 1988
[87] PCT Pub. No.: WO88/03083
   PCT Pub. Date: May 5, 1988

[30] Foreign Application Priority Data

Oct. 30, 1986 [JP] Japan .................. 61-256978

[51] Int. Cl.⁴ .............................................. B29C 45/78
[52] U.S. Cl. ................................. 425/136; 425/143; 425/144; 425/170
[58] Field of Search ............... 425/136, 138, 143, 144, 425/150, 169, 170; 264/40.6

[56] References Cited

FOREIGN PATENT DOCUMENTS 60-196324 10/1985 Japan .
60-230817 11/1985 Japan .
61-114833 6/1986 Japan .

Primary Examiner—Jay H. Woo
Assistant Examiner—Timothy W. Heitbrink
Attorney, Agent, or Firm—Staas & Halsey

[57] ABSTRACT

An injection molding machine includes a numerical control system in communication with a host computer, the numerical control system having incorporated therein a computer, wherein the injection molding machine can itself start and stop in operation on the basis of stored data indicating that the injection molding machine is in a state capable of being operated or in a state incapable of being operated. Pre-processing is executed in response to a start-up signal from the host computer (steps S4 through S9). If a malfunction or abnormality happens during the pre-processing, the location and thus the existence of the abnormality is stored in memory of the numerical control system. After completion of the pre-processing, if the stored abnormalities are judged to be restorable on the basis of the storage contents in the memory, an abnormality restoration processing is executed (S17) and, subsequently, automatic operation is carried out (S11). A terminating process is then executed in response to a stop command from the host computer (S14), and the operation is halted.

1 Claim, 2 Drawing Sheets

4,826,418

INJECTION MOLDING MACHINE CAPABLE OF STARTING AND STOPPING BY REMOTE-CONTROL

BACKGROUND OF THE INVENTION

1. Field of the Invention

The present invention relates to a purely electronic type injection molding machine equipped with a numerical control system having incorporated therein a computer.

2. Description of the Related Art

In an injection molding machine of the hydraulic type, an electromagnetic valve or the like is controlled by commands from a control system to drive an actuator, thereby working the injection molding machine. This type, however, does not store operating conditions of the injection molding machine. Information on a state as to whether or not the injection molding machine is capable of being operated, is not also stored in the injection molding machine per se. On the other hand, in an injection molding machine of a purely electronic type which is controlled by a numerical control system having incorporated therein a computer and which is driven by a servomotor, a memory device has stored therein all of the various kinds of setting values and operating conditions of the injection molding machine. The operating conditions include an operating condition when malfunction occurs during operation of the machine so that an alarm is issued and the operation of the machine is interrupted, and other operating conditions.

SUMMARY OF THE INVENTION

It is an object of the invention to provide an injection molding machine in which when a start-up command is received, the injection molding machine per se judges whether or not the machine is capable of being operated, and can start and stop in operation.

In order to achieve the above-mentioned object, in an injection molding machine of a purely electronic type comprising a numerical control system having incorporated therein a computer, the invention comprises: means for transmitting and receiving an external remote signal; pre-processing control means for controlling a pre-processing operation for working of the injection molding machine when an injection molding machine working command is inputted from the transmitting and receiving means; detecting means for detecting abnormalities of the injection molding machine; abnormal location storing means for storing abnormal locations detected by the detecting means; abnormality judging means for judging, after completion of the pre-processing operation, whether or not the abnormalities are restorable, on the basis of the abnormal locations stored in the abnormal location storing means; restoring means for restoring restorable ones of the abnormalities judged by the abnormality judging means; means for automatically controlling an operation of the injection molding machine when the abnormal locations are eliminated; and post-processing means for executing a termination processing of the operation of the injection molding machine as a stop signal is inputted into the transmitting and receiving means, and then halting the operation of the injection molding machine.

As described above, in the injection molding machine of a purely electronic type which is controlled by the numerical control system having incorporated therein the computer, the arrangement of the invention is such that, by utilizing the fact that the injection molding machine is controlled in a purely electronic fashion, as the start-up signal is received from a remote location, the injection molding machine automatically executes the pre-processing and, subsequently, starts in operation, and as the stop signal is received, the injection molding machine automatically executes the post-processing and, subsequently, stops in operation. With such an arrangement, it is made possible to start and stop operation of the injection molding machine from the remote location, and a plurality of injection molding machines can be controlled from the remote location.

DETAILED DESCRIPTION OF THE PREFERRED EMBODIMENT

Figure 1:
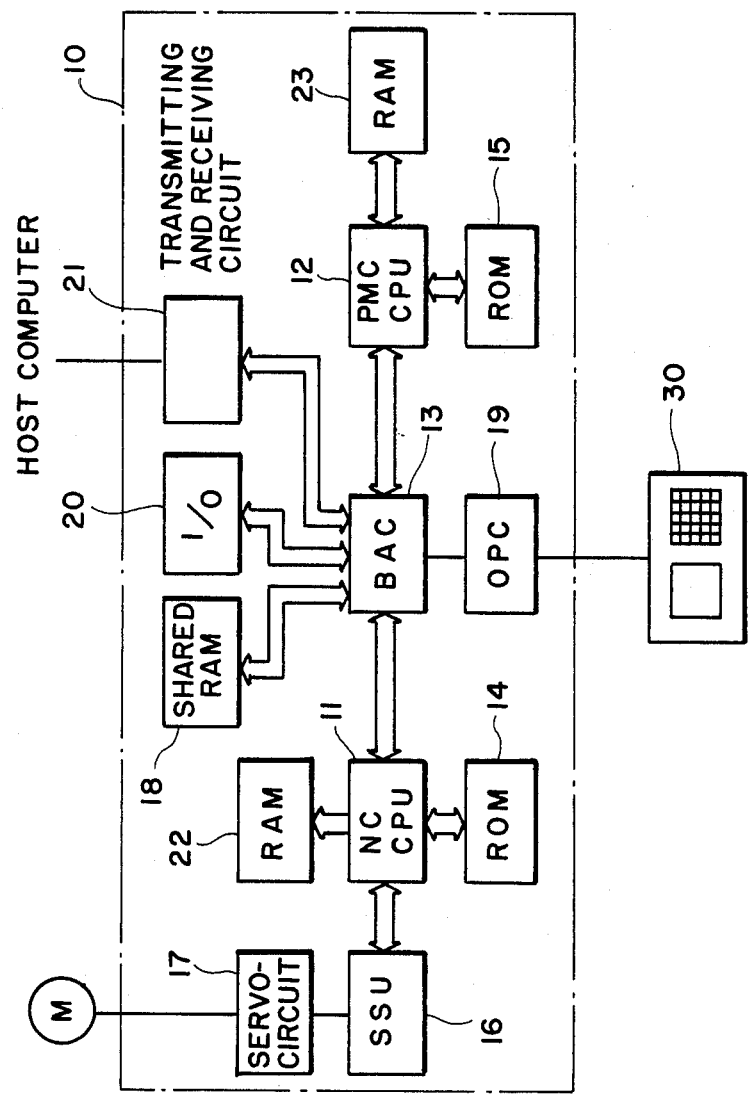
FIG. 1 is a block diagram showing a principal portion of an embodiment of the present invention.

In FIG. 1, the reference numeral 10 denotes a numerical control system (hereinafter referred to as "NC system") having incorporated therein a computer for controlling an injection molding machine. The NC system 10 comprises an NC micro processor (hereinafter referred to as "CPU") 11 and a CPU 12 for a programmable machine controller (hereinafter referred to as "PMC"). Connected to the PMC CPU 11 is a ROM 15 which has stored therein a remote-control program, a sequence program for the injection molding machine, and the like subsequently to be described. Connected to the NC CPU 11 is a ROM 14 which has stored therein a monitor program for globally controlling the injection molding machine. Also connected to the NC CPU 11 through a servo-interface (SSU) 16 are servo-circuits 17 for drivingly controlling respective servomotors M which are provided respectively for driving a shaft for injection, a shaft for clamping, a shaft for rotation of a screw, a shaft for an ejector, and other shafts. Only one of the servomotors M and only one of the servo-circuits 17 are shown in FIG. 1. Reference numeral 18 denotes a nonvolatile shared RAM having a backup power supply. The RAM 18 is provided for storing therein programs for controlling respective operations of the injection molding machine, respective setting values for various kinds of molding conditions, current values of respective control points of a heat cylinder, malfunction locations and the like subsequently to be described. The reference numeral 20 designates an input/output circuit which is connected to various kinds of sensors and actuators (both omitted from illustration) of the injection molding machine. The reference numeral 21 denotes a transmitting and receiving circuit which is connected to a host computer, not shown, for enabling the injection molding machine to be remote-controlled. The NC CPU 11, the PMC CPU 12, the shared RAM 18, the input/output circuit 20 and the transmitting and receiving circuit 21 are bus-connected to a bus arbiter controller (hereinafter referred to as "BAC") 13 which is adapted to control buses to be used. Further, the BAC 13 is connected to a manual data input instrument with a display (hereinafter referred to as "CRT/MDI") 30 through an operator panel controller 19.

Additionally, reference numeral 22 denotes a RAM which is utilized by the NC CPU 11 for temporal storage of data or the like during execution of various kinds of processings. Reference numeral 23 designates a RAM which is utilized by the PMC CPU 12 for temporal storage of data or the like during execution of various kinds of processings.

With the arrangement described above, upon setting of the various molding conditions, a scene for setting the various molding conditions is displayed on a CRT screen of the CRT/MDI 30. The various molding conditions are inputted by a keyboard or the like of the CRT/MDI 30 and are stored respectively into predetermined addresses of the shared RAM 18. Moreover, although not shown, temperatures at respective heating zones of the heat cylinder are detected respectively by temperature sensors such as thermocouples or the like every constant cycles. The detected temperatures are inputted into the input/output circuit 20 through an A/D converter, and are written respectively into predetermined addresses of the shared RAM 18.

The embodiment is similar to a conventional one in that a start command can be inputted from the CRT/MDI 30 to work the injection molding machine. This, however, has no relation to the subject matter of the present invention and will be omitted.

Figure 2:
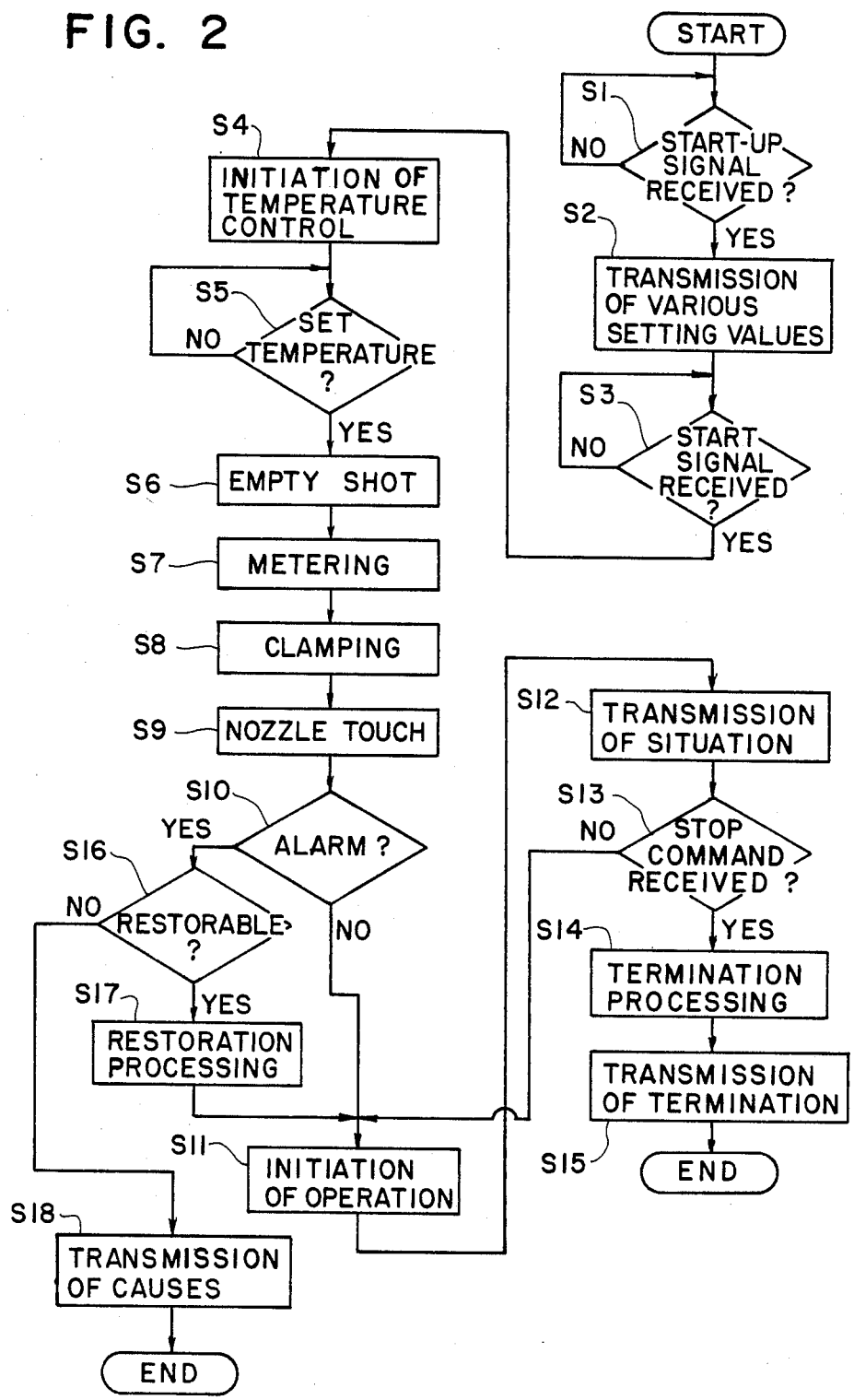
FIG. 2 is an operation processing flow chart for the embodiment of FIG. 1.

The remote-control of the injection molding machine according to the embodiment will next be described with reference to FIG. 2.

When the injection molding machine is stopped in operation and is in a waiting condition, the PMC CPU 12 judges whether or not the start-up command is inputted from the host computer through the BAC 13 and the transmitting and receiving circuit 21 (step S1). As the start-up command is inputted, the PMC CPU 12 reads the addresses of the respective molding condition setting values in the shared RAM 18, and transmits the setting values of the respective molding conditions to the host computer (step S2). The host computer confirms the received various setting values, and outputs a start signal if the setting values are not in error. When the PMC CPU 12 receives the start signal (step S3), the PMC CPU 12 controls, through the BAC 13 and the input/output circuit 20, band heaters at the respective heating zones on the heat cylinder, a mold temperature regulator and the like, to initiate such a control as to bring the temperature control points to their respective setting temperatures (step S4). The PMC CPU 12 judges whether or not the detecting temperatures inputted from the respective sensors reach the respective setting values (step S5). When the temperature control points reach their respective setting values, the PMC CPU 12 outputs an empty-shot command to the NC CPU 11 through the BAC 13. As the empty-shot command is received, the NC CPU 11 drives, through the servo-interface 16 and the servo-circuit 17, the servomotor M for the injection shaft at a low speed to thereby move the screw forwardly (toward the mold) at a low speed (step S6). Subsequently, as the empty shot is completed, the screw is rotated (step S7), and metering is initiated. As a metering point is reached, a clamping mechanism is driven to carry out clamping of the mold (step S8). Then, an injection unit is moved forwardly to bring a nozzle of the heat cylinder into touch with a sprue bush of the mold (step S9).

If operational abnormalities occur during execution of the steps S4 through S9, which are pre-processing steps for start-up of the injection molding machine operation, the operational abnormalities are detected by conventional program processing which is executed in parallel with the steps S4 through S9 and which includes a procedure referring to the outputs of various sensors. The detected abnormalities are stored respectively into predetermined addresses of the shared RAM 18. That is, the shared RAM 18 has stored therein data (abnormal alarms) respectively indicating whether the temperature of the heat cylinder is appropriate, whether the metering is normally carried out, whether the clamping is normally performed, and whether the nozzle touch is normally effected. The PMC CPU 12 judges whether or not abnormal alarms are stored in the shared RAM 18 (step S10). If abnormal alarms are stored in the shared RAM 18, it is judged whether or not the abnormalities relating respectively to the alarms are restorable on the basis of the type or kind of the stored alarm data (step S16). The abnormalities incapable of being restored include ones which happen in the actuator system, such as an abnormality of the servomotor, and the like. On the other hand, the abnormalities occurring in the controlling system are almost always capable of being restored, so as to be usually carried out.

Accordingly, if the abnormalities are incapable of being restored, the causes of the abnormalities are transmitted to the host computer (step S18), to terminate processing without working the injection molding machine. On the other hand, if the abnormalities are restorable, restoration processings of the respective abnormalities are executed respectively on the basis of programs which are stored in the ROM 15 and each of which corresponds to an associated one of the abnormal locations. "Abnormal location" refers to the existence of an abnormality, or the location (one of the various operating sections) within the injection molding machine at which an operational abnormality occurs. Thus, abnormal location represents a type of abnormality, such as an abnormality in the heating cylinder temperature, the clamping operation, the nozzle touch operation, etc. (step S17). Thus, as the abnormalities are entirely eliminated, the operating cycle of the injection molding machine is initiated (step S11). As one operational cycle is completed, data relating to the operating situation at that time, that is, data relating to the molding operation such as a cycle time, temperature, an amount of situation cushion and the like are transmitted to the host computer (step S12). Subsequently, it is judged whether or not a stop command is received from the host computer (step S13). If the stop command is not received, the program is again returned to the step S11, and operation of the next molding cycle is initiated. On the other hand, if the stop command is received, a terminating processing is executed (step S14). That is, the injection unit is moved rearwardly to disengage the nozzle from the sprue bush of the mold. Resin remaining in the cylinder is purged, and working is halted. A terminating signal is transmitted to the host computer (step S15). Thus, the remote-control processing of the injection molding machine is terminated.

I claim:

1. An injection molding machine of purely electronic type having a numeric control system comprising:
   a host computer; and
   a control computer in communication with the host computer for controlling the injection molding machine, the control computer including
   means for transmitting and receiving external remote signals including an injection molding machine working command signal and a stop signal to and from the host computer;

pre-processing control means for controlling a pre-processing operation for working of the injection molding machine when the injection molding machine working command signal is inputted from the transmitting and receiving means;

detecting means for detecting abnormalities of the injection molding machine during the pre-processing operation;

storing means for storing abnormalities of the pre-processing operation detected by the detecting means;

abnormality judging means for judging, after completion of said pre-processing operation, whether or not the detected and stored abnormalities are restorable;

restoring means for restoring restorable ones of the abnormalities judged by the abnormality judging means;

means for automatically controlling an operation of the injection molding machine when the abnormalities are eliminated; and post-processing means for executing a termination processing operation of the injection molding machine when the stop signal is inputted into said transmitting and receiving means, and then halting the operation of the injection molding machine.

* * * * *